(No Model.)
G. W. RUDD.
ANIMAL TRAP.
No. 415,567. Patented Nov. 19, 1889.
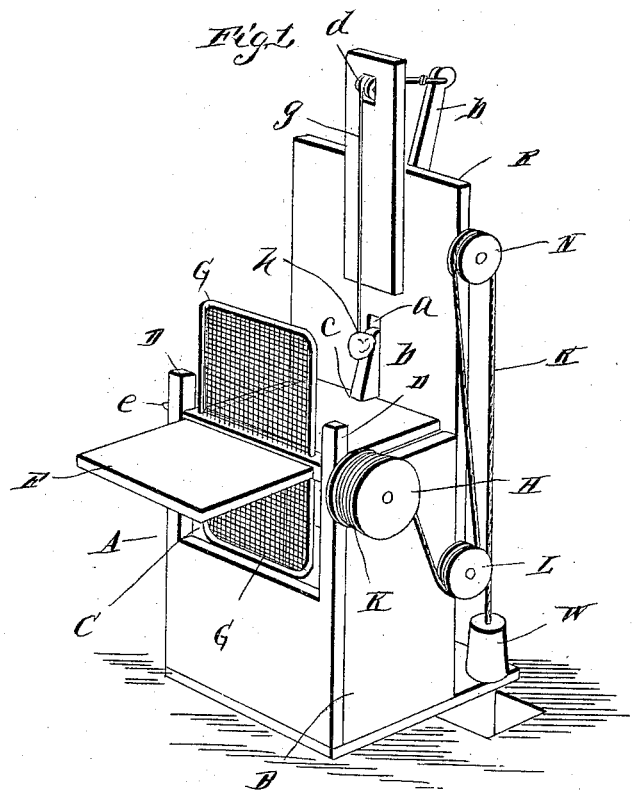
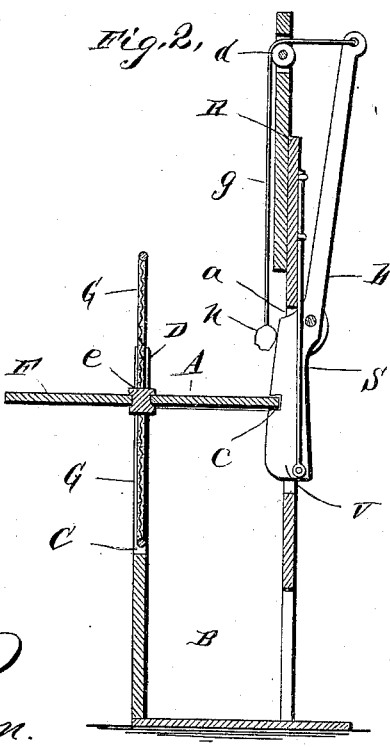
WITNESSES
C. L. Taylor,
Villette Anderson.
INVENTOR
Geo W. Rudd,
by E. W. Anderson,
his Attorney

UNITED STATES PATENT OFFICE.

GEORGE W. RUDD, OF CORYDON, KENTUCKY.

ANIMAL-TRAP.

SPECIFICATION forming part of Letters Patent No. 415,567, dated November 19, 1889.

Application filed June 29, 1889. Serial No. 316,086. (No model.)

*To all whom it may concern:*

Be it known that I, GEORGE W. RUDD, a citizen of the United States, and a resident of Corydon, in the county of Henderson and State of Kentucky, have invented certain new and useful Improvements in Animal-Traps; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of a perspective view of this invention. Fig. 2 is a sectional view.

This invention has relation to animal-traps; and it consists in the construction and novel arrangement of devices, all as hereinafter set forth, and pointed out in the appended claim.

In the accompanying drawings, the letter A designates a chute leading to a receptacle B, and having the upper portion of the front cut away at C and provided with the lateral bearings at D for the shaft $e$ of the winged tilting platform F, which is provided with the bail-form wire knockers G. A pulley H is provided on the end of the shaft $e$ of sufficient size to contain enough of the cord K to operate the trap several times. The cord K extends downward under the pulley L and up over the pulley N, and thence downward, being provided with the weight W at its end.

The pulley N is pivoted on a journal secured to the upwardly-extending rear board R, which projects above the level of the tilting platform, and is slotted at $a$ for the passage of the foot of the lever-trigger $b$, which is notched at $c$. The trigger is pivoted to a bearing at the back of the board R, and a straight spring S, secured to the back of the board R, is pivoted to the extension V of the trigger below its foot to hold the latter inward or in position for engagement.

In the top of the board R over its slot $a$ is provided a small pulley $d$ to receive a cord $g$, which extends from the oblique upper arm of the lever-trigger over said pulley and downward, terminating a little above the level of the tilting platform. At the end of this cord is the bait hook or attachment, as at $h$.

When the bait is pulled by an animal standing on one of the wings of the tilting platform, the upper arm of the trigger is drawn forward by the cord $g$ and the foot of the trigger is released from the wing of the tilting platform on which the animal stands. The weight of the animal in connection with the action of the weighted cord K causes the platform to turn, letting the animal fall to the bottom of the chute, the bail-form striker G following the wing of the platform and knocking the animal down the chute in case it should attempt to hold by the margin thereof. The pull upon the bait-cord having ceased, the trigger-foot returns to its set position and engages the opposite wing of the tilting platform as it comes down.

What I claim as my invention, and desire to secure by Letters Patent, is—

The animal-trap consisting of the chute having hung in a slot in its rear side the trigger, to the lower end of which is connected a straight upright spring suitably secured to the trap-closure, the upper end of said trigger standing obliquely outward and having connected to it the bait-suspending cord, passed over a pulley, the tilting platform carrying vertical wings and hung in the upper front edge of the chute, one edge of said platform normally engaging a notch in the lower inner edge of the trigger, and the weighted cord wound around a drum or pulley on the shaft of the tilting platform and passed down under a second pulley and upward over an elevated pulley, substantially as set forth.

In testimony whereof I affix my signature in presence of two witnesses.

GEORGE W. RUDD.

Witnesses:
H. H. BRANDIS,
I. C. HOLBERT.